(12) United States Patent
Fujiyama et al.

(10) Patent No.: US 7,530,458 B2
(45) Date of Patent: May 12, 2009

(54) CONNECTING FASTENER

(75) Inventors: Takeo Fujiyama, Tokyo (JP); Junichi Tamura, Tokyo (JP); Yoshihiro Kaneko, Tokyo (JP); Mitsuhisa Machida, Tokyo (JP); Koichi Kohama, Tokyo (JP)

(73) Assignee: Max Kabushiki Kaisha, Tokyo (JP)

( * ) Notice: Subject to any disclaimer, the term of this patent is extended or adjusted under 35 U.S.C. 154(b) by 373 days.

(21) Appl. No.: 10/491,004

(22) PCT Filed: Sep. 27, 2002

(86) PCT No.: PCT/JP02/10110

§ 371 (c)(1),
(2), (4) Date: Oct. 15, 2004

(87) PCT Pub. No.: WO03/029662

PCT Pub. Date: Apr. 10, 2003

(65) Prior Publication Data

US 2005/0043106 A1    Feb. 24, 2005

(30) Foreign Application Priority Data

Sep. 28, 2001    (JP) ............................... 2001-299872

(51) Int. Cl.
*F16B 15/08* (2006.01)
(52) U.S. Cl. ................... 206/345; 206/343; 411/442
(58) Field of Classification Search ......... 206/338–347; 411/442
See application file for complete search history.

(56) References Cited

U.S. PATENT DOCUMENTS 3,167,778 A * 2/1965 Decot et al. ............... 206/345
3,471,088 A  10/1969 Quinn
3,592,339 A * 7/1971 Briggs, Jr. ................. 206/344
3,945,551 A  3/1976 Sato et al.

(Continued)

FOREIGN PATENT DOCUMENTS

DE    4406556    8/1995

(Continued)

OTHER PUBLICATIONS

International Search Report issued in a corresponding PCT application.

(Continued)

*Primary Examiner*—Mickey Yu
*Assistant Examiner*—Steven A. Reynolds
(74) *Attorney, Agent, or Firm*—Buchanan Ingersoll & Rooney PC

(57) ABSTRACT

The object of the invention is to make it possible to fill connecting fasteners of various thicknesses in a single kind of fastener magazine. A connecting fastener is such that the thickness of a connecting band (13a, 13b) is increased or decreased according to the stem diameter of a screw (12a, 12b), whereby the width of the connecting fastener (11a, 11b) as seen in the direction of travel thereof is made constant, and the connecting band (13a, 13b) is brought into engagement with a longitudinal guide groove (5a) formed in the fastener passageway of the fastener magazine (5) of a screw fastening machine. This makes it possible to stably hold the connecting fasteners (11a, 11b) of various stem diameters at a given height, thus improving the versatility of the fastener magazine.

10 Claims, 11 Drawing Sheets

U.S. PATENT DOCUMENTS

| | | | |
|---|---|---|---|
| 4,836,372 A * | 6/1989 | Shelton | 206/344 |
| 4,877,135 A * | 10/1989 | Gabriel et al. | 206/344 |
| 5,240,161 A | 8/1993 | Kaneko | |
| 5,609,712 A * | 3/1997 | Takumi | 156/298 |
| 5,733,085 A | 3/1998 | Shida et al. | |
| 6,494,322 B1 * | 12/2002 | Habermehl et al. | 206/347 |
| 6,598,777 B2 | 7/2003 | Osuga et al. | |
| 6,708,861 B2 | 3/2004 | Osuga et al. | |
| 6,763,991 B2 | 7/2004 | Hamano | |
| 6,837,414 B1 | 1/2005 | Chou | |
| 6,902,092 B2 | 6/2005 | Osuga et al. | |
| 2005/0017050 A1 | 1/2005 | Fujiyama et al. | |

FOREIGN PATENT DOCUMENTS

| | | |
|---|---|---|
| EP | 0 893 204 | 1/1999 |
| JP | 185263/1985 | 6/1987 |
| JP | 64-23369 | 2/1989 |
| JP | 16970/1989 | 8/1990 |
| JP | 27470/1990 | 12/1991 |
| JP | 5-63776 | 8/1993 |
| JP | 5-74774 | 10/1993 |
| JP | 7-266247 | 10/1995 |
| JP | 2570701 | 2/1998 |
| JP | 3284531 | 3/2002 |

OTHER PUBLICATIONS

International Search Report issued in an application corresponding to US 2005-0017050.

European Search Report issued in a corresponding application.

* cited by examiner (a)

(b)

(c)

(d)

(a)

(c)  (b)

(d)

(f)　(e)　(d)　(c)　(b)　(a)

(a)

(b)

(c)

Y (S=3/1)

(d)

CONNECTING FASTENER

TECHNICAL FIELD

The present invention relates to a connecting fastener having a plurality of screws or nails attached in parallel on a sheet or a belt of a resin, a paper, or the like. In particular, it relates to a connecting fastener capable of loading fasteners of various kinds of sizes to one kind of the fastener magazine.

BACKGROUND ART

There is a screw fastening machine and a nail driving machine using a connecting fastener with a plurality of fasteners such as screws and nails disposed in parallel and connected on a sheet as is well known. According to this kind of the fastening machine, a fastener magazine is attached on the rear surface of a nose so that the connecting fasteners loaded in the fastener magazine are supplied successively into the nose per one cycle operation by a feed pawl of a fastener feeding mechanism interlocked with the lifting and lowering operation of the driver in order to continuously fasten the screws or drive the nails. The cross sectional shape of the fastener passage in the fastener magazine is a T-shape, and it is formed such that the fastener head is placed in the upper wide width part of the T-shaped space and the lower surface of the fastener head is supported by the wide width part so as to guide the connecting fastener in a suspended state.

The conventional fastener magazine cannot support the head of the fastener having a head diameter smaller than the size of the lower part narrow width part of the fastener passage so that the fastener is dropped, and thus it cannot be used, and a problem is involved in that the size range of the usable fastener is narrow because a fastener having a thickness larger than the fastener passage width cannot naturally be loaded. Moreover, a problem is also involved in that the height required to support the fastener differs if the head shape differs such as the flat head and the pan head.

Accordingly, the technological problem to be solved arises in that the connecting fasteners of various thickness should be loaded in the fastener magazine, and the connecting fastener should be supported at a constant height, and an object of the present invention is to solve the above-mentioned problem.

DISCLOSURE OF THE INVENTION

In order to solve the above-mentioned problem, the invention of claim 1 of the present invention has the following configuration. That is, in a connecting fastener comprising a plurality of fasteners such as screws and nails disposed in parallel on a connecting band, a guide part for guiding the connecting band is provided on the side surface of the connecting band.

Moreover, the invention of claim 2 of the present invention has the following configuration. That is, in the connecting fastener according to claim 1, the guide part is supported by the engagement with a guide groove formed on the wall surface of a fastener passage in a fastener magazine of a screw fastening machine, a nail driving machine, or the like.

Moreover, the invention of claim 3 of the present invention has the following configuration. That is, in the connecting fastener according to claim 1 or 2, the guide part of the connecting band has a rib shape.

Moreover, the invention of claim 4 of the present invention has the following configuration. That is, in the connecting fastener according to claim 1, the guide part of the connecting band has a rib shape, and is supported such that a pressuring member provided on the wall surface of a fastener passage in a fastener magazine has contact with the rib.

Moreover, the invention of claim 5 of the present invention has the following configuration. That is, in connecting fastener foamed integrally by a connecting band supporting a plurality of fasteners having a shaft part of a predetermined length disposed with equal intervals, the connecting band comprises a base member made of a soft synthetic resin, and an adhesive member to be adhered to the base member by welding or another means, and the base member comprises a supporting surface for supporting the shaft part of the fastener, and a guide part to be guided by a fastener machine such as a screw fastening machine and a nail driving machine, and the fastener is supported by the connecting band such that the shaft part having contact with the supporting surface is adhered by the adhesive member to be adhered on the supporting surface.

BEST MODE FOR CARRYING OUT THE INVENTION

Figure 1:
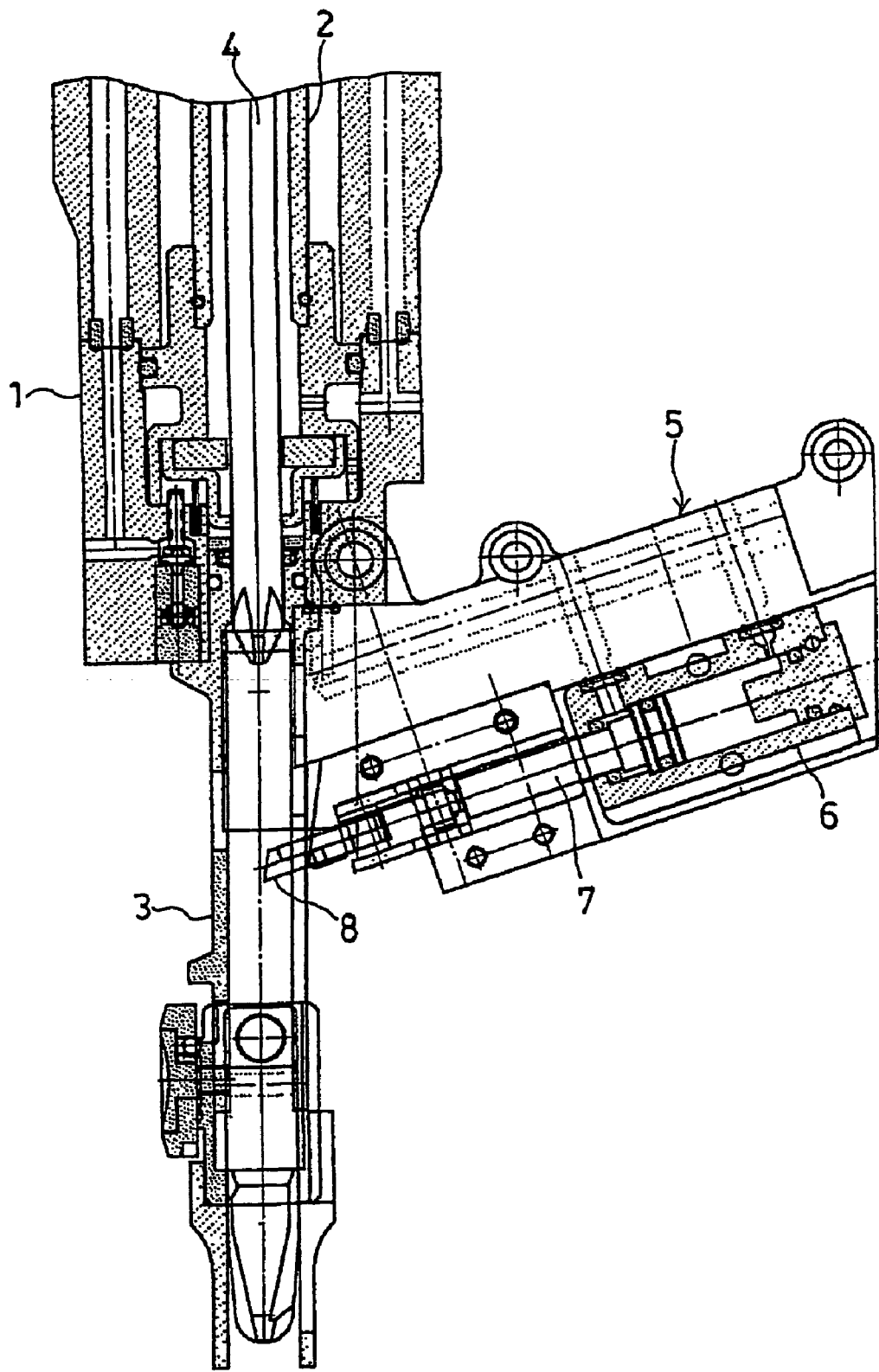
FIG. 1 is a partial cross sectional view of an air impact driver.

Hereinafter, an embodiment of the present invention will be explained with reference to the drawings. First, as an example of a fastening machine using a connecting fastener, the configuration of an air impact driver will be explained simply. FIG. 1 shows the top end part of the air impact driver. The numeral 1 is a cylinder housing, 2 is an air cylinder, 3 is a nose, and 4 is a driver bit, with a fastener magazine 5 mounted on the rear surface of the nose 3. Although it is not shown in the figure, an air impact mechanism to be driven by an air motor is disposed in the upper part of the cylinder housing 1, and a piston of the air cylinder 2 is coupled with a spline shaft interlocked with the air impact mechanism. The driver bit 4 is coupled to the front side of the piston, and when the trigger lever is pulled, the piston and the driver bit 4 are lowered in the air cylinder 2 while being rotated and driven by the air impact mechanism in order to fasten the connecting screw fed in the nose 3 into an object to be screwed.

An air cylinder 6A of a spring offset type is disposed on the side surface of the fastener magazine 5, and a feed pawl 8 of a ratchet type is mounted on the tip end of a piston rod 7 of the air cylinder 6. When the air cylinder 2 and the air motor are activated, the high pressure air is supplied to the air cylinder 6 so that the piston rod 7 and the feed pawl 8 are moved backward. Further, when the driver bit 4 moves upward to the initial position after completing the screw fastening operation, the pressured air in the air cylinder 6 is discharged, and the piston rod 7 and the feed pawl 8 are advanced by a spring. At the time, the feed pawl 8 contacted elastically with the side surface of the shaft part of the connecting fastener by the spring (not shown) enters into the gap between the screws in order to feed the connecting fastener forward so that the top fastener is loaded into the nose 3.

Figure 2:
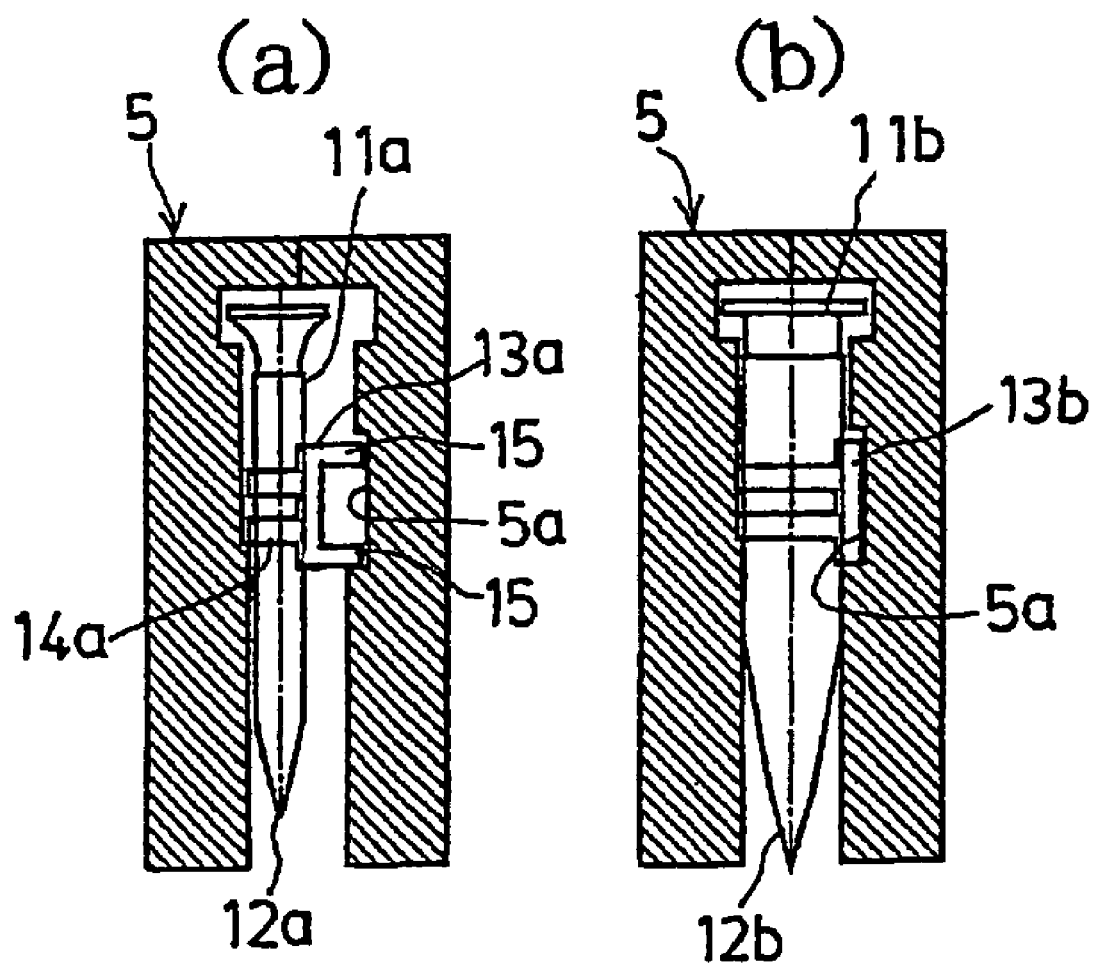
FIG. 2 shows a fastener magazine and connecting fastener; (a) is an explanatory diagram of the state in which a connecting fastener having a small shaft diameter is loaded, and (b) is an explanatory diagram of the state in which a connecting fastener having a large shaft diameter is loaded.

FIG. 2 shows the state in which the connecting fastener of the present invention is loaded in the fastener magazine 5. The connecting fastener 11a shown in (a) has a screw 12a having a small diameter mounted, and the connecting fastener 11b shown in FIG. 1(b) has a screw 12b having a large diameter mounted. The connecting bands 13a, 13b of the connecting fasteners 11a, 11b each elongate from the front side to the deeper side of the drawing, and ring type holder parts 14a, 14b for supporting screws 12a, 12b are arranged with a certain distance on the left side surface (feed pawl side). According to the connecting fastener 11a with the thin screws 12a connected, a rib 15 projecting horizontally from the upper and lower both end parts of the connecting band 13a to the outer side is provided so as to provide the total width of the connecting fastener 11a and the connecting fastener 11b equally.

Figure 3:
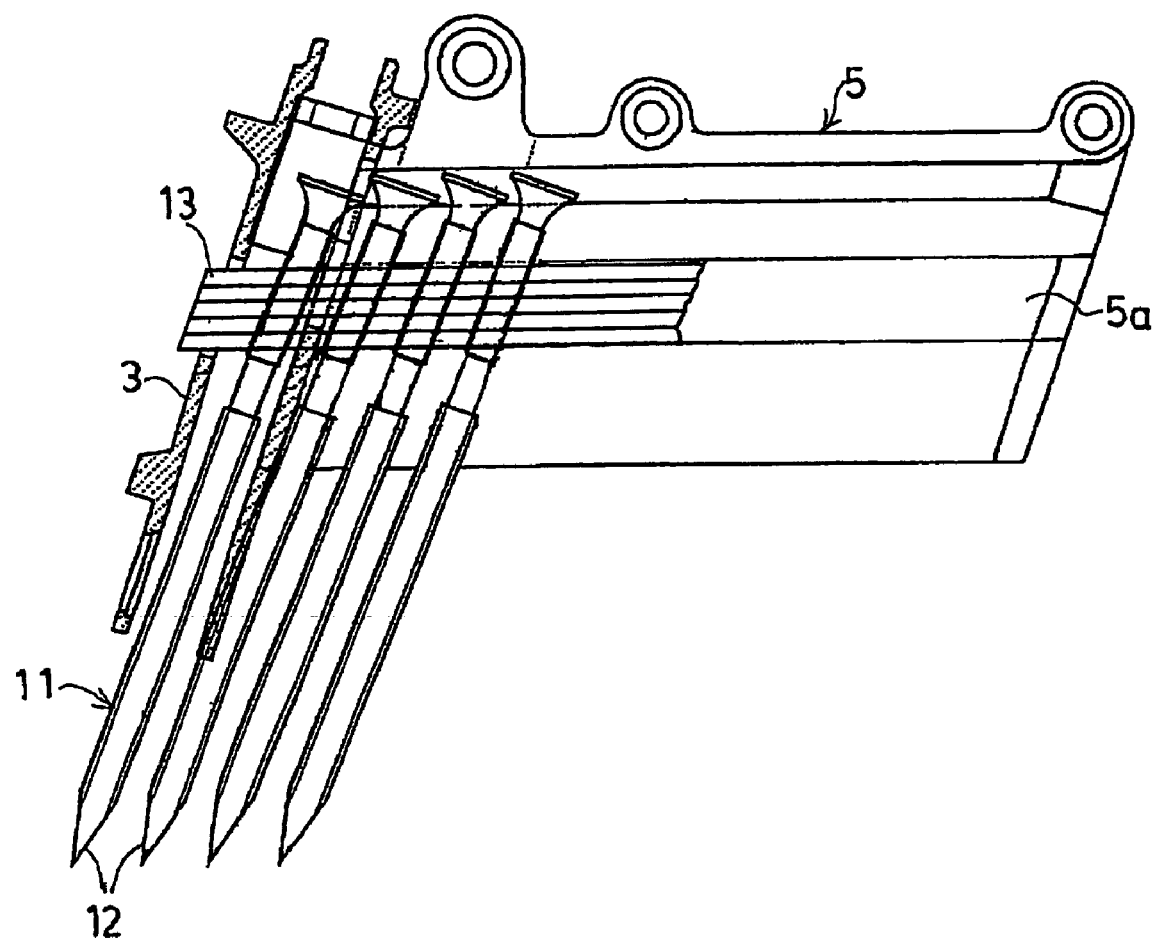
FIG. 3 is an exploded side view of a fastener magazine.

A guide groove 5a elongating across the front and rear both ends is provided in the right wall surface (surface facing the feed pawl) of the fastener passage of the fastener magazine 5. The horizontal width between the left wall surface on the feed pawl side and the bottom of the guide groove 5a is provided substantially equal to the horizontal width of the connecting fasteners 11a, 11b, and the vertical width of the guide groove 5a is set substantially equal to the vertical width of the connecting bands 13a, 13b. Moreover, in the case where the connecting fastener 11a or 11b is loaded into the fastener magazine 5, as shown in FIG. 2 and FIG. 3, the connecting band 13 is engaged with the guide groove 5a so that the connecting fastener 11 is supported at a predetermined height regardless of the fastener diameter.

Furthermore, the fasteners having a small diameter and a large diameter to be supported by the connecting fasteners 11a, 11b are mounted such that the position of the head in the vertical direction becomes substantially equal with respect to the connecting bands 13, 13b.

Accordingly, since the entire horizontal width is made equal by increasing or reducing the thickness of the connecting band according to the fastener diameter so that the connecting band 13 is engaged with the guide groove 5a provided in the fastener magazine 5 so as to be supported at a predetermined height, the fasteners of the various sizes can be supported stably at a constant height with respect to the driver bit, and the versatility of the fastener magazine can be improved.

Although the horizontal width of the connecting fastener may be adjusted constantly by increasing or reducing the thickness of the entire connecting band without providing the ribs, in this case, a problem is involved in that the amount of using the resin material of the connecting band is increased for a fastener having a narrow diameter and the placing load at the time of fastening the screw or placing the nail is increased due to the decline of the flexibility. However, by adjusting the entire horizontal width by partially increasing the thickness by the rib 15 instead of increasing the total connecting band as shown in the figure, the above-mentioned problem can be avoided.

Moreover, the position of the rib is not necessarily at the upper end or the lower end of the connecting band, and a rib may be engaged with the guide groove by narrowing the upper and lower width of the guide groove 5a. Moreover, instead of providing the ribs along the entire length of the connecting band, ribs of a certain length may be disposed continually with certain intervals provided therebetween, and thus a configuration capable of guiding the connecting band can be adopted.

Figure 4:
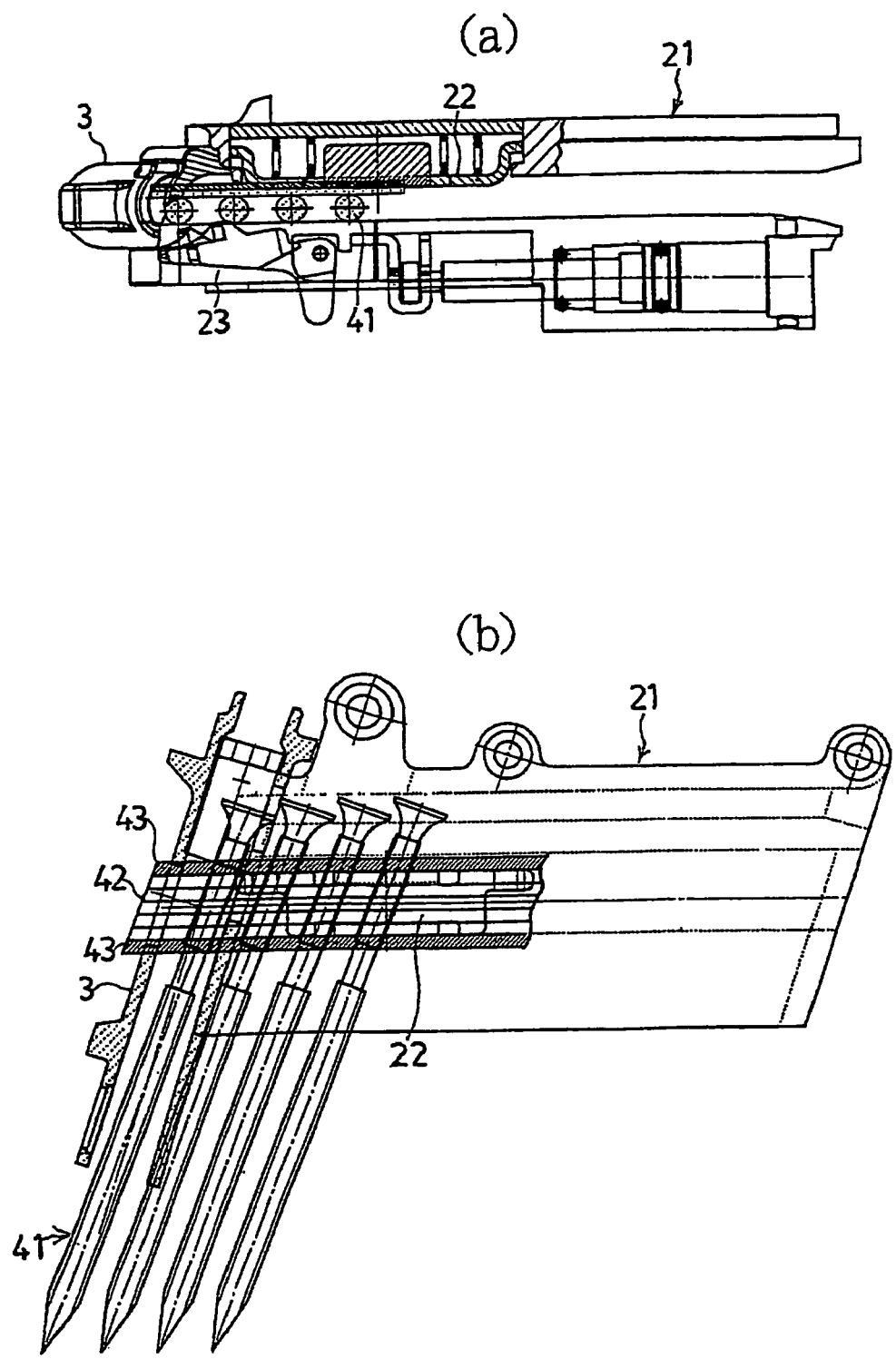
FIG. 4 shows a fastener magazine provided with a pressing plate; (a) is a plan cross sectional view, and (b) is an exploded side view.
Figure 5:
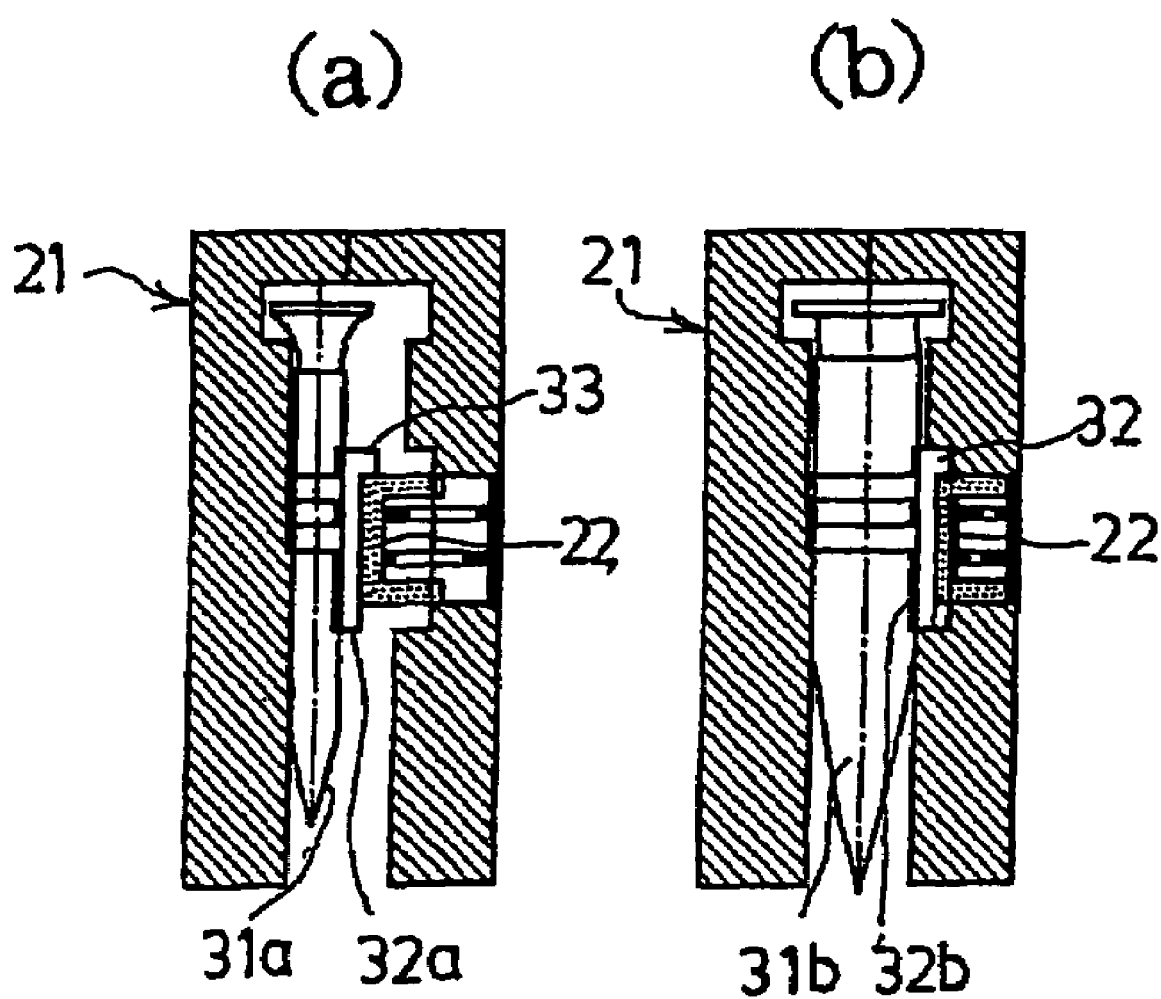
FIG. 5 shows a fastener magazine and a connecting fastener; (a) is an explanatory diagram of the state in which a connecting fastener having a small shaft diameter is loaded, and (b) is an explanatory diagram of the state in which a connecting fastener having a large shaft diameter is loaded.
Figure 6:
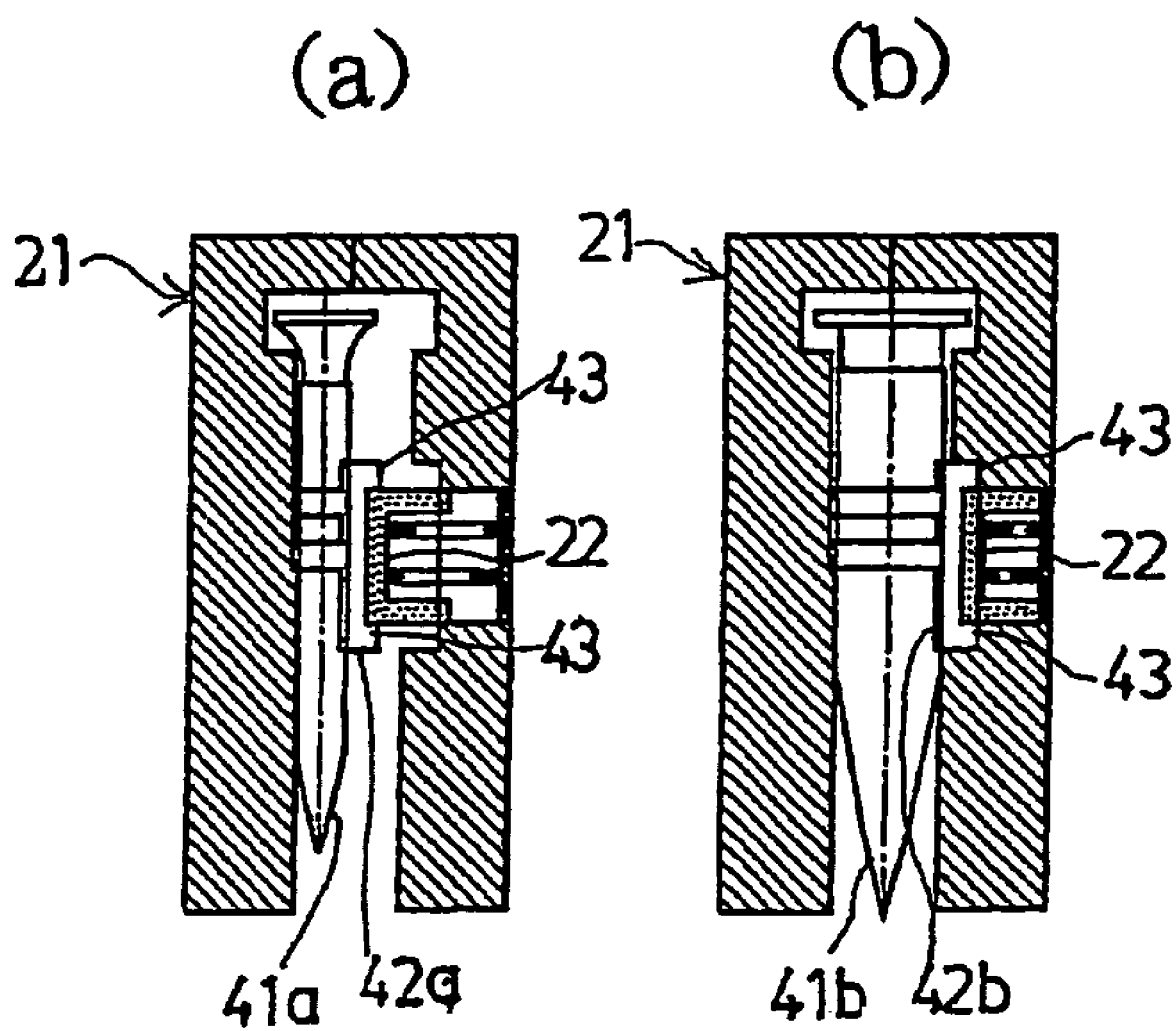
FIG. 6 shows a fastener magazine and a connecting fastener; (a) is an explanatory diagram of the state in which a connecting fastener having a small shaft diameter is loaded, and (b) is an explanatory diagram of the state in which a connecting fastener having a large shaft diameter is loaded.

FIGS. 4 to 6 show the second embodiment. In stead of the configuration for constantly controlling the horizontal width of the connecting fastener by increasing or reducing the thickness of the connecting band, the thickness of the connecting band is provided constantly and the connecting fastener is pressed and supported by a pressing plate 22 provided in a fastener magazine 21. FIGS. 4(a), (b) show the fastener magazine 21, wherein the pressing plate 22 of a spring pressurizing type faces a feed pawl 23 in the fastener passage. The fastener passage has a wide width such that a thick fastener can be loaded as well, and the pressing plate 22 presses the connecting band of the connecting fastener so as to thrust the same against the wall surface on the feed pawl 23 side.

Connecting fasteners 31a, 31b shown in FIGS. 5(a), (b) have an angle-shaped cross sectional shape provided with a rib 33 projecting from the upper end part of the connecting bands 32a, 32b toward the direction of the pressing plate 22 such that the pressing plate 22 presses the connecting bands 32a, 32b so as to thrust the connecting fasteners 31a, 31b against the wall surface, and the rib 33 is supported on the upper surface of the pressing plate 22. Connecting fasteners 41a, 41b shown in FIGS. 6(a), (b) have a channel-shaped cross sectional shape provided with two ribs 43 projecting from the upper and lower both end parts of connecting bands 42a, 42b toward the direction of the pressing plate 22 such that the vertical movement of the connecting fasteners 41a, 41b is limited by the pressing plate 22 entering between the upper and lower two ribs 43. As shown in FIGS. 5 and 6, the connecting fastener can be supported at a constant height regardless of the size of the fastener by having the distance from the connecting band to the fastener upper end constantly.

The present invention is not limited to the above-mentioned embodiment, and various modifications can be made within the technological scope of the present invention, and naturally the present invention includes the modified embodiments as well.

Figure 7:
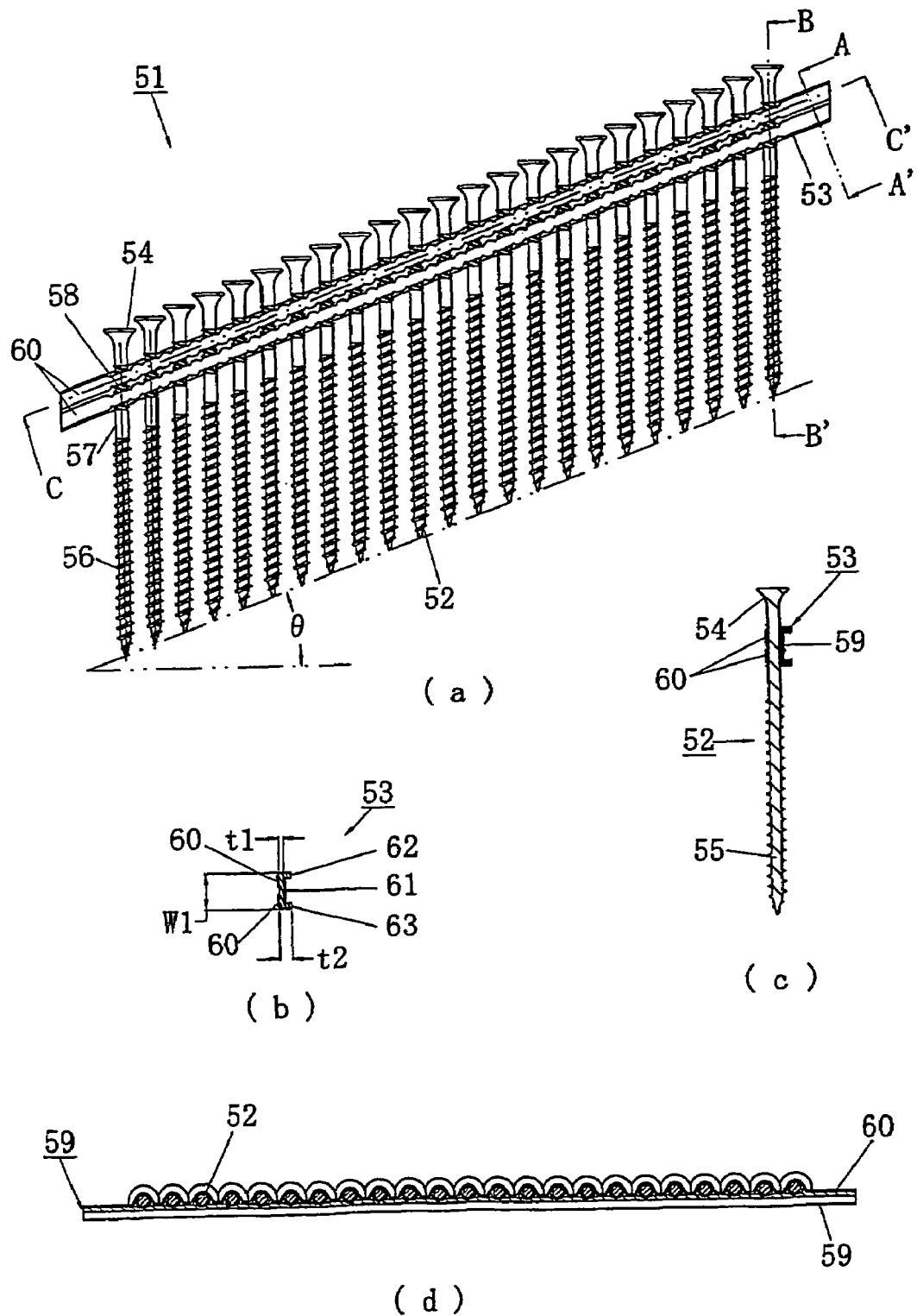
FIG. 7 shows a connecting fastener of a third embodiment of the present invention; (a) is a right side view of the connecting fastener, (b) is a cross sectional view taken along line A-A' in the above-mentioned right side view, (c) is a cross sectional view taken along line B-B', and (d) is a cross sectional view taken long line C-C'.
Figure 8:
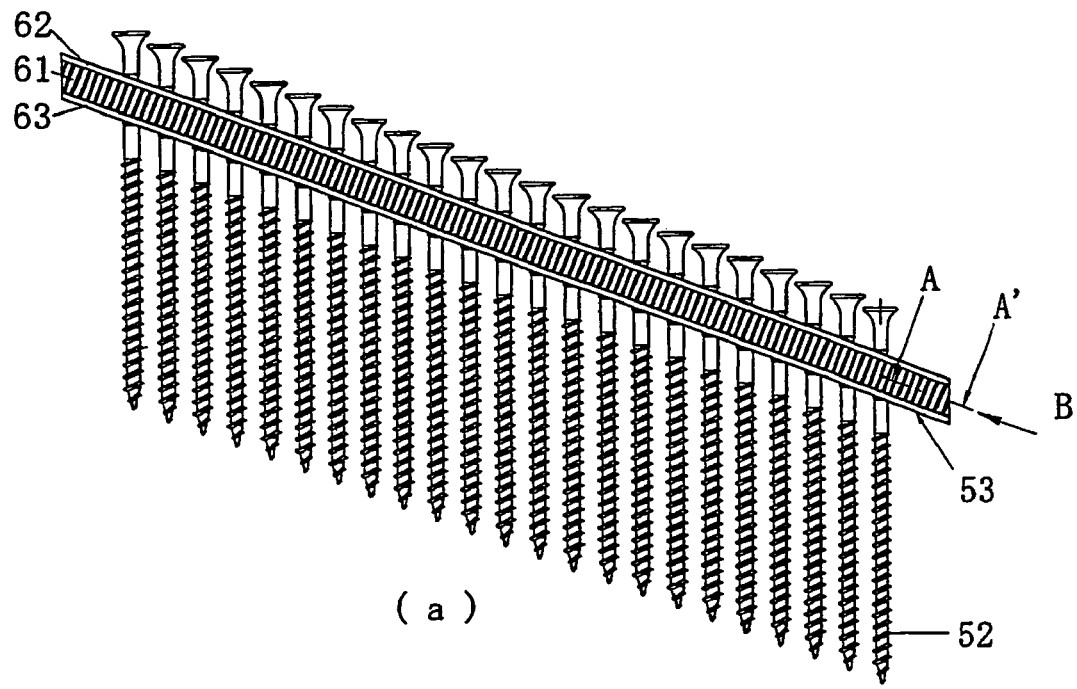
FIG. 8 shows a connecting fastener of the third embodiment of the present invention; (a) is a left side view of the above-mentioned connecting fastener, (b) is a cross sectional view taken along the line A-A' in the above-mentioned left side view, (c) is a diagram of enlarging the part designated by the circle X in FIG. 8(*b*) by 5 times, and (d) is a diagram of enlarging the part shown by arrow B in FIG. 8(*a*) by 5 times (the screw is omitted).
Figure 8:
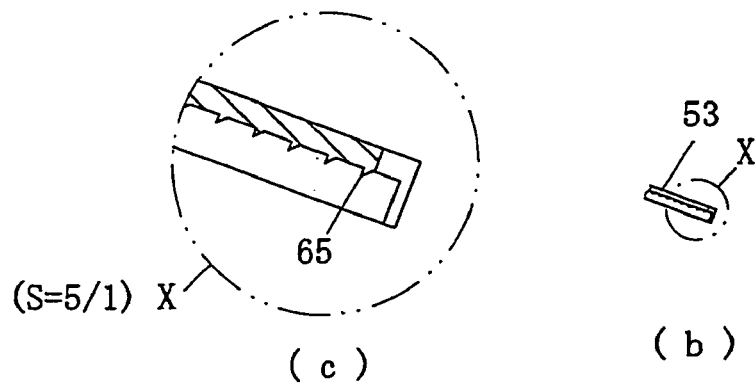
Figure 8:
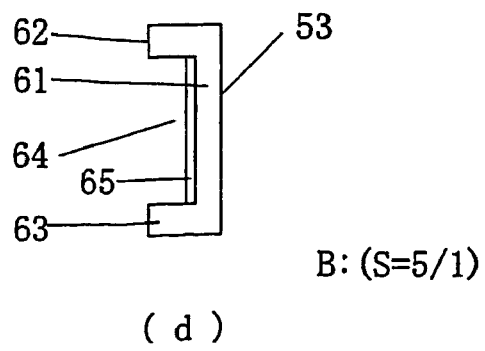
Figure 9:
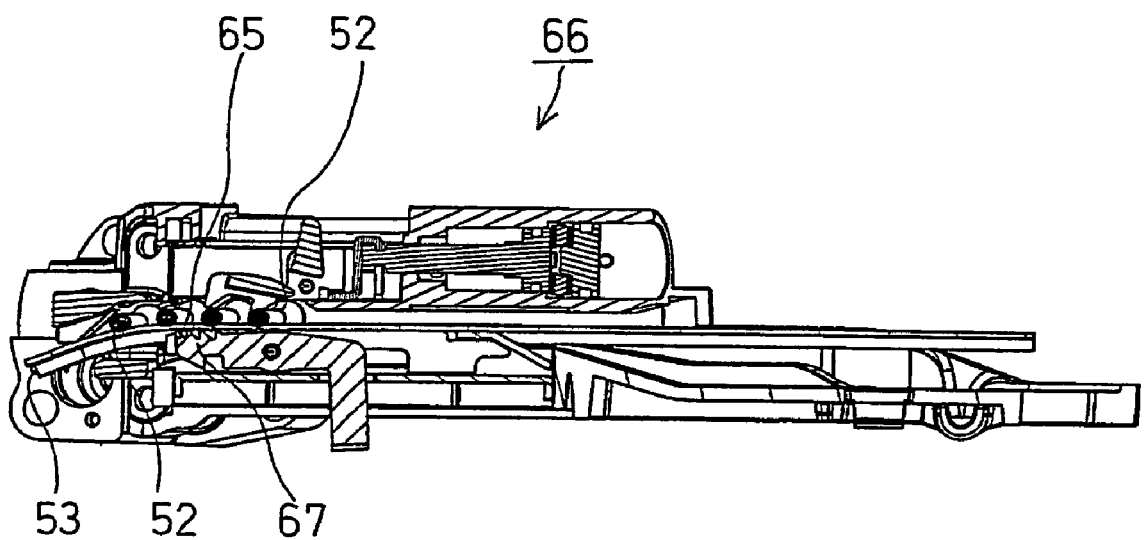
FIG. 9 is an explanatory diagram showing the state in which the connecting fastener according to the third embodiment of the present invention is loaded on a fastener machine.

Next, a third embodiment will be explained with reference to FIGS. 7 to 10. FIG. 7(a) is a right side view of the connecting fastener, FIG. 7(b) is a cross sectional view taken along the line A-A' in the above-mentioned right side view, FIG. 7(c) is a cross sectional view taken along the line B-B', and FIG. 7(d) is a cross sectional view taken along the line C-C'.

The numeral 51 shows a connecting fastener according to this embodiment, with a plurality of screws 52 used as the fasteners bound by a connecting band 53. Like the above-mentioned embodiment, the connecting fastener is to be used for an fastener machine of an impact driver type. A screw 52 is substantially the same as that of the above-mentioned embodiment. The screw 52 comprises a head part 54 having a cross-shaped concavity part (not shown) on the upper end surface to be engaged with the driver bit, and a shank 55 having a screw thread formed on the outer circumference. Moreover, in the shank 55, a screw thread (right-hand screw) 56 is formed at the effective screwing part with respect to the work in the substantially ⅔ area of the lower part, and a screw threadless part 57 and a screw thread (left-hand screw) 58 to be the inverse screw with respect to the above-mentioned screw thread are formed at the substantially ⅓ area of the upper part.

Although the following explanation is given with an example of the case of using the screw 52 as the fastener, the fasteners to be bound as the connecting fastener are not limited to the screws, and it is applied to the other fasteners such as nails.

The connecting fastener 51 is formed integrally by arranging a plurality of the screws 52 of the above-mentioned configuration with the shanks 55 in parallel, and supporting the side part of the above-mentioned inverse screw formed in the upper part area of the shank 55 by the connecting band 53. Moreover, the screws 52 are disposed so as to be displaced upward with constant intervals such that the head parts 54 of the adjacent screws do not interfere with each other. The arrangement angle θ of the screws 52 generated by the arrangement is substantially 21 degrees based on the flat surface orthogonal to the shank 55.

The connecting band comprises a base member 59 having a predetermined length formed in a C-shaped cross section, and an adhesive member 60 to be welded to the base member 59.

The base member 59 has a band-like part 61 having a substantially 10 mm width W1 and a substantially 1.2 mm thickness t1, with ribs 62, 63 provided perpendicularly along the longitudinal direction on the upper and lower both end rims of the band-like part 61. The portions provided with the ribs 62, 63 serve as a guide part to be guided in the magazine of the fastener machine.

The apparent thickness (external shape) t2 of the connecting band 53 is substantially 3.4 mm by forming the ribs 62, 63. The apparent thickness t2 is a size to be changed optionally according to the size of the screw for binding, or the like as explained in the above-mentioned embodiment, and the other values of a size are not limited to the above-mentioned values. Moreover, the other various sizes can be changed optionally within the scope along the gist of the present invention to achieve the function and effect to be described later.

Next, the binding structure of the screw 52 by the connecting band 53 will be explained. The screw 52 has a structure such that the shank 55 is contacted with the surface without having the ribs 62, 63 projected (supporting surface) of the above-mentioned base member 59, and then supported by the two adhesive members 60 adhered to the above-mentioned base member 59 while covering the shank 55 (see FIG. 7(d)).

The production apparatus for the connecting fastener 51 comprises a supply system for a base member 59 for molding a molten resin into a predetermined cross sectional shape while extruding the same, a supply system for a series of the screws 52 arranged with equal intervals by the above-mentioned arrangement angle, and a supply system for the adhesive member 60 for molding a molten resin into a predetermined cross sectional shape while extruding the same. Then, the screws 52 are contacted successively with the supporting surface of the base member 59 to be extruded continuously while being molded, the adhesive member 60 having been extruded continuously, substantially at the same time, is supplied to cover the screws 52, and the adhesive member 60 is welded onto the above-mentioned supporting surface of the base member 59 while being pressed by a predetermined press mold.

FIG. 8(a) shows a left side view of the above-mentioned connecting fastener 51. Moreover, FIG. 8(b) is a cross sectional view taken along the line A-A' in the above-mentioned left side view, FIG. 8(c) is a diagram of enlarging the part designated by the circle X in FIG. 8(b) by 5 times, and FIG. 8(d) is a diagram of enlarging the part shown by the arrow B in FIG. 8(a) by 5 times (the screw 52 is omitted).

As mentioned above, the connecting band 53 is formed in a shape having the band-like part 61 and the ribs 62, 63. As a result, a concavity part 64 is provided by the band-like part 61 and the ribs 62, 63. A plurality of saw-blade-like small projecting bars 65 are formed on the base member 59 in the concavity part 64 with equal intervals perpendicularly to the longitudinal direction of the connecting band 53. The small projecting bars 65 are formed by a predetermined shaping mold after or at the time of extruding the base member 59 to be supplied by the above-mentioned production apparatus. Moreover, the small projecting bars 65 are a portion to be engaged with a feed pawl 67 to be operated like a ratchet provided in a fastener machine 66 so as to support connecting fastener 51 having been fed out no to be moved backward (see FIG. 9).

Figure 10:
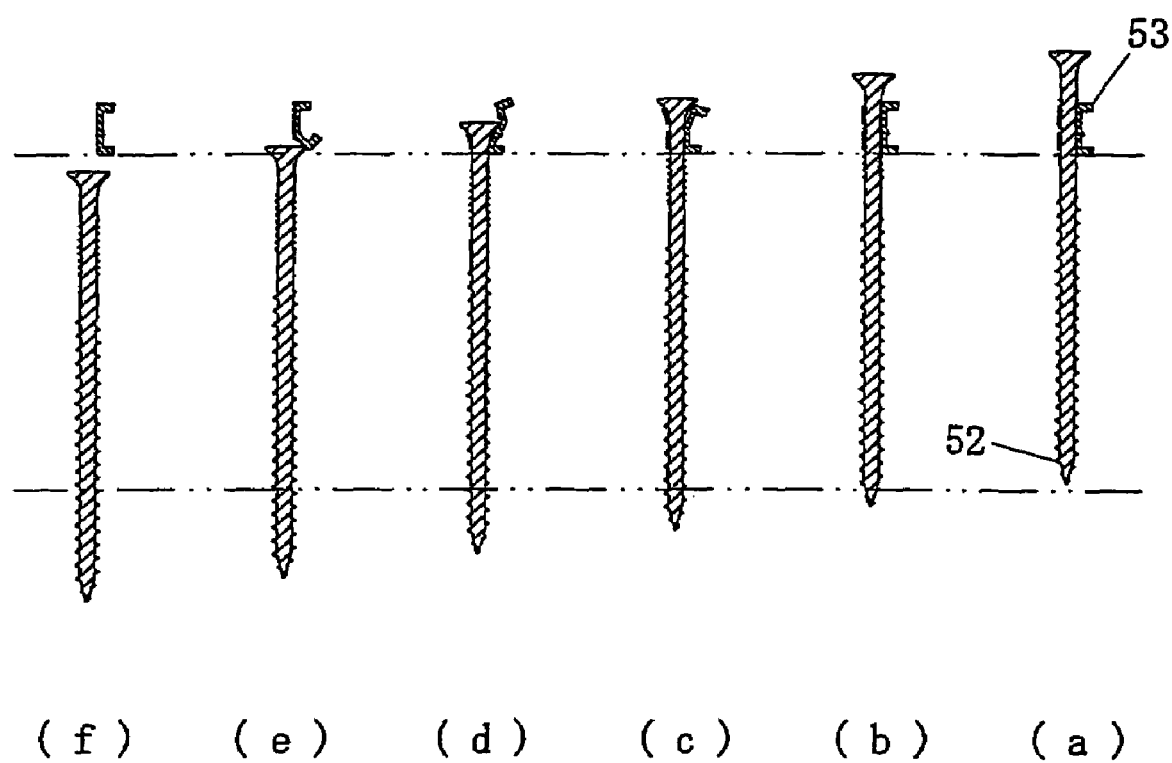
FIG. 10(*a*) to (*f*) represent the state in which the screw is pressed down by the driver bit so as to be lowered successively.

According to the connecting fastener 51, the guide part shape of the connecting band 53 has a constant shape such that the fastener members of the different standards can be used in the same fastener machine. However, it does not mean that the guide part of the connecting band 53 needs to have the certain shape, and the function to be explained below is required. With reference to FIG. 10, the function will be explained.

The diagrams shown in (a) to (f) of FIG. 10 represent the state in which the screw 52 is pressed down by the driver bit so as to be lowered successively. Although only the screw 52 and the connecting band 53 are shown in the figure for the explanation, the connecting band 53 is guided in the magazine in the fastener machine 66 so as to be supplied to a constant position with respect to the ejection path. Therefore, even in the case where the screw 52 is lowered, since the connecting band 53 is guided so as to be supported at the constant position, it is not lowered at the same time.

FIG. 10(a) shows the state before the screw 52 is pressed down by the driver bit in the ejection path, and when the screw 52 is pressed down by the driver bit, as shown in (b), only the screw 52 starts to be lowered without changing the position of the connecting band 53.

Although the connecting band 53 supports the screw 52 by the base member 59 and the adhesive member 60, since the base member 59 and the adhesive member 60 are both made of a soft resin material, they are deformed without supporting the screw 52.

FIG. 10(c) shows the state in which the head part 54 of the screw 52 pushes and spreads the upper end rim of the base member 59 and the adhesive member 60 adhered to the upper position. That is, the head part 54 deforms the hole (ring type holder) having the substantially same diameter as the shaft diameter of the shank 55 formed between the base member 59 and the adhesive member 60, and it ruptures the adhesive member 60 according to the passage of the head part 54 as shown in (d).

Moreover, FIG. 10(d) shows the state of starting the rupture of the adhesive member 60 adhered to the lower position after the rupture of the adhesive member 60 adhered to the upper position. FIG. 10(e) shows the state in which the head part 54 is lowered while deforming the base member 59 after the rupture of the adhesive member 60. FIG. 10(f) shows the state in which the screw 52 is completely separated from the bind of the connecting band 53 so as to be detached completely.

As mentioned above, the connecting band 53 is deformed appropriately by the descent of the screw 52 so as to allow passage of the head part 54 and releases the support of the screw 52 by the connecting band 53 at the same time. This function is important as a function of the connecting band 53, and in order to smoothly perform the function, the above-mentioned material and shape are adopted as the optimum example. In the case where this function cannot be performed smoothly, it may cause oblique placement of the screw 52 with respect to the work, or jamming derived from bending in the ejection path.

As mentioned above, not only the supply of the screw 52 in the fastener machine 66 to a constant position, but also the function of certainly supporting the screw 52 and certainly releasing supporting are required for the connecting band 53. Therefore, as the optimum embodiment, the cross sectional shape of the connecting band 53 is provided as a substantially C-shape so that although having a wide apparent width, the flexibility is provided, and although having the flexibility, the predetermined rigidity is provided by the rib. Moreover, in order to release the support of the screw 52 by being ruptured by the deformation of a certain level or more, the structure of supporting the outer circumference of the shank by the narrow adhesive band is used.

Next, a fourth embodiment according to the connecting fastener will be explained with reference to FIG. 11(a).

Although the principal structure is same as the above-mentioned embodiments, the connecting band 70 used in this embodiment differs from the above-mentioned examples in the following points. That is, in the rib 71 of the connecting band 70, there is provided a concavity part 73 corresponding to the supporting portions of the screw 72. Thereby, the rib 71 can easily be deformed so that the passage of the head part of the screw 72 is facilitated, and thus the screwing operation of the screw 72 is not prevented.

Next, a fifth embodiment according to the connecting fastener will be explained with reference to FIG. 11(b).

Although the principal structure is same as the above-mentioned embodiments, the connecting band 80 used in this embodiment differs from the above-mentioned examples in the following points. That is, in the rib 81 of the connecting band 80, there is provided a concavity part 83 corresponding to the supporting portions of the screw 82. Then, the concavity part 83 is provided deeper than the case of the fourth embodiment and the concavity part is also formed in a base member 84 partially. This structure is preferable in the case where the thickness of the base member 84 should be relatively thickened and the flexibility is required for the connecting band 80.

In the case where a base member without a rib is used, the concavity part may be formed in the base member 84, corresponding to the supporting portion of the screw 82 as the applied form of the fifth embodiment.

Next, a sixth embodiment will be explained with reference to FIG. 11(c).

Although the principal structure is same as the above-mentioned embodiments, the connecting band 90 according to this embodiment differs from the above-mentioned examples in the following points. The connecting band 90 supports a screw 91 by a base member 92 and an adhesive member 93, and in this regard, it is same as the above-mentioned other embodiments.

It is a characteristic of this embodiment that the projecting rim corresponding to the above-mentioned projecting rib is not provided in the base member 92, and it has a structure for substituting the same that the side surface of the base member 92 is dented like an arc. According to the structure, the predetermined rigidity and flexibility can be provided to the connecting band 90.

Next, a seventh embodiment will be explained with reference to FIG. 11(d).

Figure 11:
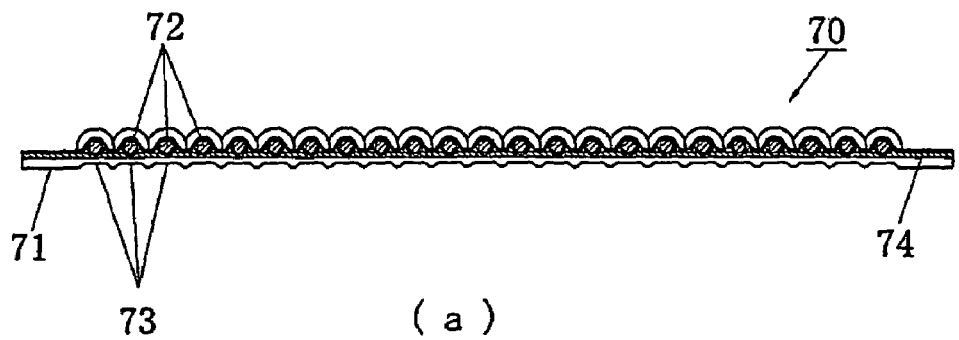
FIG. 11 is an explanatory diagram for explaining connecting fasteners according to fourth to seventh embodiments of the present invention; (a) shows a fourth embodiment of the present invention, (b) shows a fifth embodiment of the present invention, (c) shows a sixth embodiment of the present invention, and (d) shows a seventh embodiment of the present invention.
Figure 11:
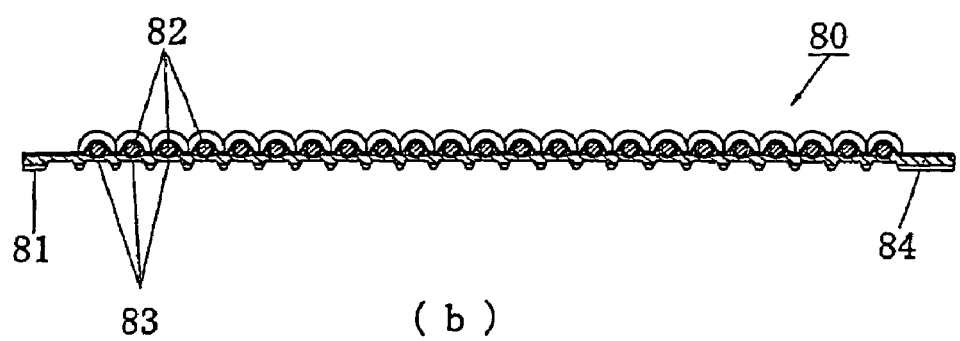
Figure 11:
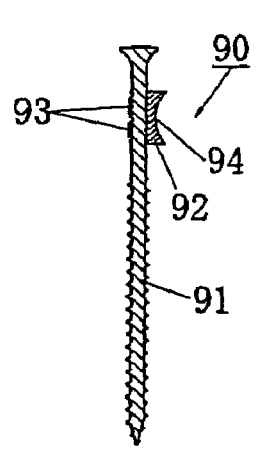
Figure 11:
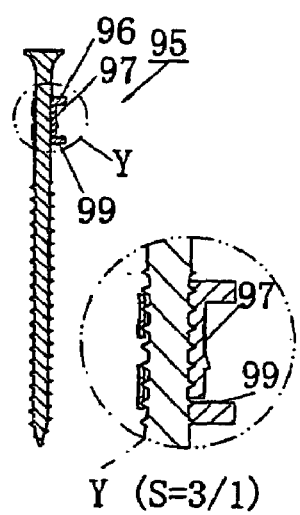

FIG. 11(d) shows another embodiment of the connecting band. Although the principal structure is same as the above-mentioned embodiments, the connecting band 95 used in this embodiment differs from the above-mentioned examples in the following points. That is, the connecting band 95 is divided into two, one is a base member 97 having a rib 96 in the upper part and the other is a rib 99 for the lower part. At the time of forming the connecting fastener, these members are shaped integrally after being supplied from different systems so that the function same as the connecting band explained in the above-mentioned third embodiment can be performed.

[Effects of the Invention]

As heretofore explained, since the connecting fastener according to claim 1 can guide the connecting fastener by supporting the guide part of the connecting band in the fastener magazine, it can be supported at a constant height regardless of the head shape of the fastener, and thus the supporting posture can be stabilized.

Since the connecting fastener according to claim 2 can support the connecting band by engaging the same with the guide groove formed in the fastener magazine regardless of the shaft diameter of the fastener by increasing or reducing the thickness of the connecting band according to the shaft diameter of the fastener, the connecting fasteners having various thickness can be loaded in one kind of the fastener magazine and the connecting fastener can be supported at a constant height.

Since the connecting fastener of claim 3 has the structure of providing the entire width of the connecting fastener constantly by increasing or reducing the partial thickness of the upper rim part, the lower rim part or the middle part between the upper and lower parts, or the like of the connecting band, the amount of using the resin material of the connecting band can be cut back as much as possible, and there is no risk of increasing the driving load at the time of fastening the screw or driving the nail because there is barely decline of the flexibility.

Since the connecting fastener of claim 4 has a structure such that the guide part is formed on the side surface of the connecting band and supported by the contact with the upper surface of the pressing plate provided in the fastener magazine, the connecting fasteners having various thickness can be loaded in one kind of the fastener magazine, the connecting fastener can be supported at a constant height, and the posture stability of the connecting fastener can be improved.

In the connecting fastener of claim 5, the connecting band for supporting the fastener serves as a guide part to be guided by the fattener machine such as the screw fastening machine and the nail driving machine. Moreover, lowering of the fastener is not prevented, because the adhesive member for supporting the fastener is ruptured at the time of ejection such as fastening or driving the fastener, or the like so as to release the support and be deformed appropriately. Thereby, inclined ejection of the fastener or bending of the fastener in the ejection path can be prevented.

DESCRIPTION OF THE NUMERALS 5 fastener magazine
6 air cylinder
7 piston rod
8 feed pawl
11a, 11b connecting fastener
12a thin screw
12b thick screw
13a, 13b connecting band
14a, 14b holder part
21 fastener magazine
22 pressing plate
23 feed pawl
31a, 31b connecting fastener
32a, 32b connecting band
33 rib
41a, 41b connecting fastener
42a, 42b connecting band
43 rib
51 connecting fastener
52 screw
53 connecting band
54 head part
55 shank
56 screw thread (right-hand screw)
57 screw threadless part
58 screw thread (left-hand screw)
59 base member
60 adhesive member
61 band-like part
62, 63 rib
64 concavity part
65 small bar part
66 fastener magazine
67 feed pawl

INDUSTRIAL APPLICABILITY

The present invention relates to a connecting fastener to be used for a fastener machine for driving a fastener such as a screw and a nail, and it is the technology to be utilized for a connecting fastener capable of use of several kinds of fasteners having different standards such as the thickness by the same fastener machine.

The invention claimed is:

1. A connecting fastener comprising a plurality of fasteners disposed in parallel on a first side surface of a longitudinally extending connecting band, the connecting band includes a guide part projecting from an opposite side surface of the connecting band, the guide part including two parallel longitudinally extending ridges that are spaced apart from each other, each ridge having a thickness that is constant, the longitudinally extending ridges configured to engage with a guide groove formed on a wall surface of a fastener passage in a fastener magazine of a fastening machine.

2. The connecting fastener according to claim 1, wherein the guide part of the connecting band has a C-shape in cross-section.

3. The connecting fastener according to claim 1, wherein the guide part of the connecting band has a rib shape, and is supported such that a pressuring member provided on a wall surface of a fastener passage in a fastener magazine has contact with the rib.

4. The connecting fastener according to claim 1, wherein engagement of the guide part with the guide groove enables the connecting fastener to be supported at a predetermined height in the fastener passage.

5. The connecting fastener according to claim 1, wherein the plurality of fasteners are screws.

6. The connecting fastener according to claim 1, wherein the plurality of fasteners are nails.

7. The connecting fastener according to claim 1, wherein the fasteners each include a shaft portion, the two longitudinally extending ridges extending substantially perpendicular to the shaft portion of the fastener.

8. A connecting fastener formed integrally by a connecting band supporting a plurality of fasteners having a shaft part of a predetermined length disposed at equal intervals, wherein the connecting band comprises:
a base member made of a soft synthetic resin, and
an adhesive member having a side adhered to the base member and the shaft part of the fastener, and
the base member comprises a supporting surface for supporting the shaft part of the fastener, and a guide part arranged on the base member on a side of the base member opposite the supporting surface, the guide part including two parallel and longitudinally extending ridges that are spaced apart from each other such that the shaft part having contact with the supporting surface is adhered by the adhesive member to the supporting surface.

9. A connecting fastener, comprising:
a plurality of fasteners each having a head portion and other portions, the plurality of fasteners disposed in parallel on a first side surface of a longitudinally extending connecting band, the connecting band including a guide part projecting from an opposite side surface of the connecting band, the guide part including two parallel longitudinally extending ridges that are spaced apart from each other and project radially beyond the head portion of the fasteners to enable the guide part to engage with a guide groove formed on a wall surface of a fastener passage in a fastener magazine of a fastening machine.

10. The connecting fastener according to claim 9, wherein the fasteners each include a shaft portion, the two longitudinally extending ridges extending substantially perpendicular to the shaft portion of the fastener.

* * * * *